United States Patent [19]

Kazumi

[11] Patent Number: 5,321,245
[45] Date of Patent: Jun. 14, 1994

[54] DATA READING DEVICE AND CONTROL SYSTEM HAVING DATA READING DEVICE

[75] Inventor: Jiro Kazumi, Yokohama, Japan

[73] Assignee: Canon Kabushiki Kaisha, Tokyo, Japan

[21] Appl. No.: 603,377

[22] Filed: Oct. 26, 1990

[30] Foreign Application Priority Data

Oct. 27, 1989 [JP] Japan ................. 1-278440
Dec. 28, 1989 [JP] Japan ................. 1-344812

[51] Int. Cl.$^5$ ............................................. G06K 7/10
[52] U.S. Cl. .................................. 235/466; 235/455; 235/462
[58] Field of Search ............... 235/466, 467, 462, 472, 235/455, 438

[56] References Cited

U.S. PATENT DOCUMENTS

| | | | |
|---|---|---|---|
| 3,925,639 | 12/1975 | Hester | 235/472 |
| 4,160,156 | 7/1979 | Sherer | 235/472 |
| 4,240,064 | 12/1980 | DevChoudhury | 235/462 |
| 4,521,678 | 6/1985 | Winter | 235/462 |
| 4,567,360 | 1/1986 | Yamada | 235/455 |
| 4,575,625 | 3/1986 | Knowles | 235/467 |
| 4,639,606 | 1/1987 | Boles et al. | 235/455 |
| 4,758,717 | 7/1988 | Shepard et al. | 235/472 |
| 4,841,132 | 6/1989 | Kajitani et al. | 235/472 |
| 4,845,349 | 6/1989 | Cherry | 235/474 |
| 4,876,571 | 10/1989 | Nakamura et al. | 355/210 |
| 4,967,188 | 10/1990 | Collins, Jr. | |

FOREIGN PATENT DOCUMENTS 0098956 1/1982 European Pat. Off. .
2183070 5/1987 United Kingdom .
2185840 7/1987 United Kingdom .

OTHER PUBLICATIONS

"Information Strich fur Strich", Funkschau, vol. 59, No. 22, Oct. 23, 1987 pp. 28, 30–32, Munich DE.

*Primary Examiner*—Eugene R. LaRoche
*Assistant Examiner*—Tan Nguyen
*Attorney, Agent, or Firm*—Fitzpatrick, Cella, Harper & Scinto

[57] ABSTRACT

A data reading apparatus has a reading device, which is set in a data read state upon operation of an operation switch, provided with a timer for measuring a first time period in which the operation switch is not operated, and for measuring a second time period in which no data input is detected while the operation switch is operated, wherein the data reading state is canceled according to an output from the first or second timer.

33 Claims, 11 Drawing Sheets

DATA READING DEVICE AND CONTROL SYSTEM HAVING DATA READING DEVICE

BACKGROUND OF THE INVENTION

1. Field of the Invention

The present invention relates to a data reading device for reading data such as a bar code, and a control system for controlling an operation on the basis of data read by the data reading device.

2. Related Background Art

In a conventional device of this type, a first input means is operated to set a read state, and a second input means is operated to transfer data to another device.

Conventionally, the first input means adopts a slide switch or a push switch. In a device of this type, a battery is used as a power supply.

However, in some devices using a slide switch, when the switch is turned on, a read LED is kept ON, and a battery is used up soon. On the other hand, in other devices using a slide switch and a timer to turn off the power supply after the lapse of a predetermined period of time, whether or not a read enable state is set cannot be determined by looking at the switch. Once the power supply is turned off by the timer, the slide switch must be turned off once, and must be turned on again.

In a device using a push button, when the device is stored in a case or a pocket, the push button is kept depressed, and a battery is undesirably used up.

As a conventional bar code data reading device, for example, a pen-like device is known. In this device, a first input means is operated to set a read state, and a second input means is operated to transfer data to another device.

Since each prior art requires the first and second input means, it is difficult to realize a more compact device. Since it is difficult to improve operability of the two input means, operability of either means must be sacrificed.

SUMMARY OF THE INVENTION

One aspect of the present invention is characterized by a data reading device, which is set in a data read state upon operation of an operation switch, comprising a first timer for measuring a time in which the operation switch is not operated, and a second timer for measuring a time in which no data input is detected while the operation switch is operated, wherein the data read state is canceled according to an output from the first or second timer.

Another aspect of the present invention is characterized in that a data transfer operation is performed in response to an operation of one switch, and a data read operation is then performed.

BRIEF DESCRIPTION OF THE DRAWINGS

FIGS. 5A, 5A-1, 5A-2 and 5B are flow charts;

DETAILED DESCRIPTION OF THE PREFERRED EMBODIMENTS

Figure 1:
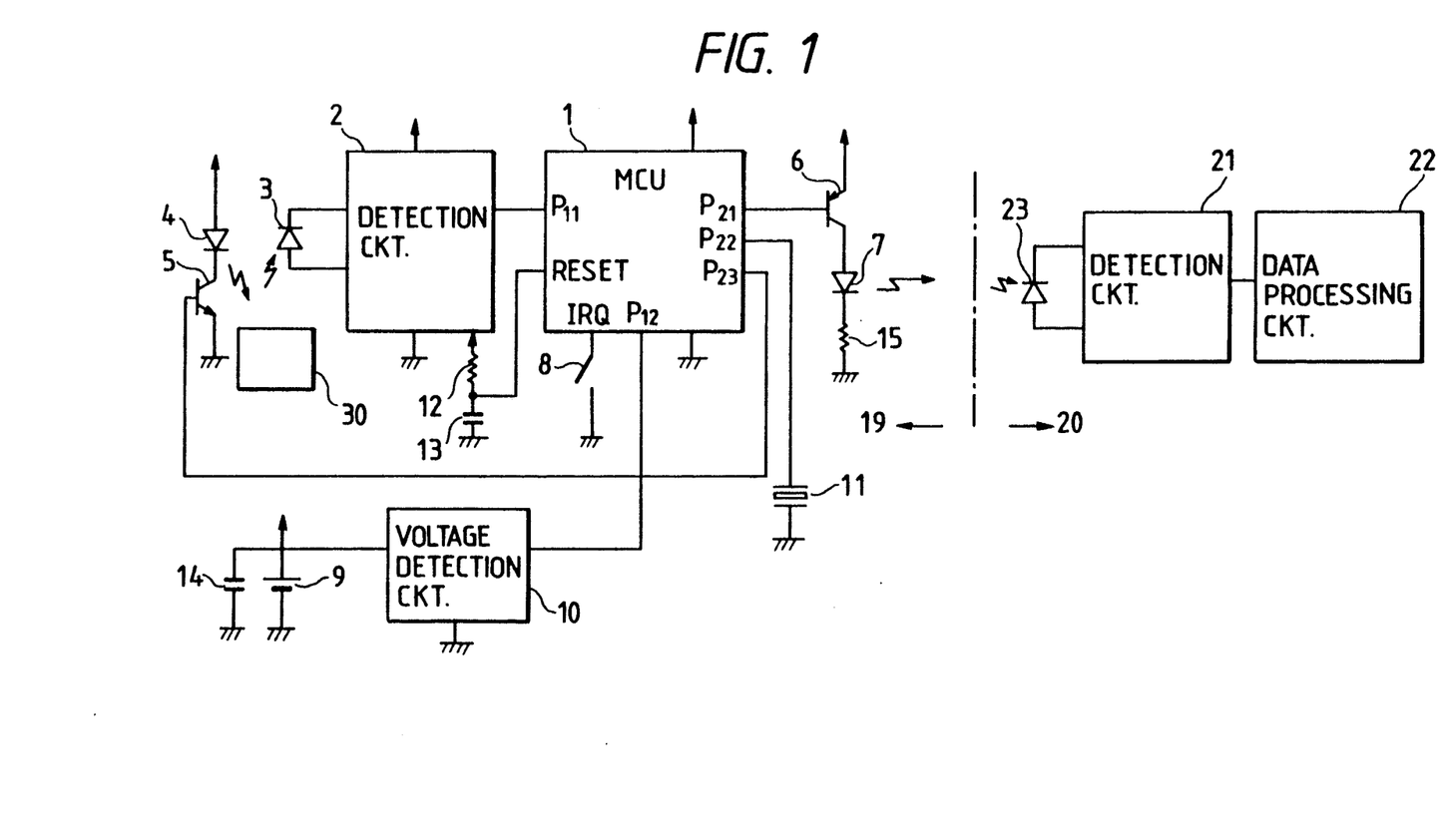
FIG. 1 is a block diagram of a circuit of the first embodiment.

FIG. 1 is a block diagram showing a control system according to the first embodiment of the present invention. The control system shown in FIG. 1 includes a data reading device 19, and a data processing device 20. The data reading device 19 has a one-chip microcomputer (to be referred to as an MCU hereinafter) 1 for controlling a bar code data reading unit. Microcomputer MCU 1 may, for example, comprise the 4 bit one chip microprocessor described at pages 463–465 of the "Handbook for Application of micro-computer and mini-computer" by Katsuhiko Fujii, Published by Asakura Publishing Co., Japan, Nov. 20, 1982. The MCU 1 includes a CPU, a ROM, a RAM, I/O terminals, a serial communication interface (to be abbreviated to as an SCI hereinafter), a timer, and the like. Of the I/O terminals of the MCU 1, an input terminal P11 is connected to the output of a code detection circuit 2. Another input terminal P12 is connected to the output of a voltage detection circuit 10. Of the I/O terminals of the MCU 1, an output terminal P23 is connected to the base of a transistor 5. Another output terminal P22 is connected to a piezoelectric buzzer 11. An output terminal P21 of the SCI of the MCU 1 is connected to the base of a transistor 6.

The collector of the transistor 5 is connected to an LED 4. A silicon photodiode (to be abbreviated to as an SPD hereinafter) 3 detects light reflected by a code (bar code) 30 which consists of optically readable black bars and white spaces, and is irradiated with light emitted from the LED 4. The detection circuit 2 detects an output from the SPD 3, and if the output represents a space of the bar code 30, the circuit 2 outputs low (L) level; if it represents a bar, the circuit 2 outputs high (H) level.

The collector of the transistor 6 is connected to an infrared light-emitting diode (to be abbreviated to as an IRED hereinafter) 7.

The reading device 19 also includes a battery 9 serving as a power supply of the reading device, and a capacitor 14. The input of the voltage detection circuit 10 is connected to the battery 9, and when the input is higher than a given voltage level, the circuit 10 outputs H level; otherwise, it outputs L level. The given voltage level is set to be slightly higher than a minimum operation voltage of the MCU 1.

The MCU 1 is set in a stop state in response to a command, i.e., stops all the operations and is set in a state with a small current consumption. When an input terminal RESET or IRQ goes to L level, the stop state is canceled, and the MCU 1 performs operations as a microcomputer.

The input terminal RESET is connected to a resistor 12 and a capacitor 13, which are connected to the power supply and a terminal GND.

The input terminal IRQ serves as an interrupt terminal, and when its input goes to L level, an interrupt operation is started. The terminal IRQ is connected to a push switch 8.

An SPD 23 and a detection circuit 21 for detecting light emitted from the IRED 7 are connected to a data processing circuit 22. The data processing circuit 22 performs necessary control on the basis of data read from the bar code.

A format of a bar code will be described below.

The bar code consists of thin lines (to be referred to as narrow bars hereinafter), thick lines (to be referred to as wide bars hereinafter), narrow intervals between adjacent bars (to be referred to as narrow spaces hereinafter), and wide bar intervals (to be referred to as wide spaces hereinafter). Each narrow bar and wide space correspond to "1", and each wide bar and wide space correspond to "0". A ratio of the widths of a narrow space and a narrow bar is 1 : 1, and a ratio of the widths of a narrow bar and a wide bar is 1:3.

Figure 2:
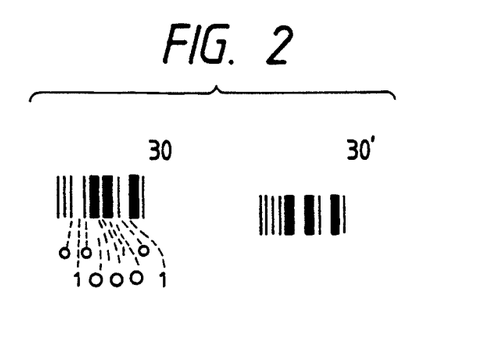
FIG. 2 shows an example of a bar code.

The bar code always starts from a combination of two narrow bars and a narrow space (to be referred to as a start bar hereinafter), as shown in FIG. 2, and ends by a narrow space sandwiched between a wide bar and a narrow bar (to be referred to as an end bar hereinafter). Data is written between the start and end bars in units of five bars and five corresponding spaces, and each unit express a numeral of one digit. Table 1 below shows the orders of "0"s and "1"s and numbers expressed thereby. For example, in a code 30 shown in FIG. 2, after the start bar, 0, 0, 1, 1, 0 and 0, 1, 0, 0, 1 are indicated by bars (where narrow bar=0 and wide bar=1), and 1, 0, 0, 0, 1 and 0, 1, 0, 0, 1 are indicated by spaces. Therefore, from Table 1, the code 30 shown in FIG. 2 is a bar code representing 01 (decimal notation), and similarly, a code 30' in FIG. 2 is a bar code representing 04 (decimal notation).

Figure 4:
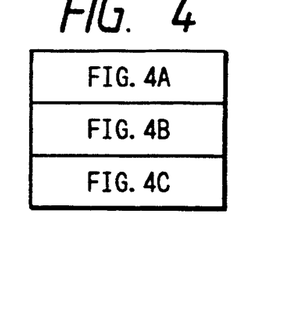
FIG. 4 shows the relationship of FIGS. 4A-4C.
Figure 4A:
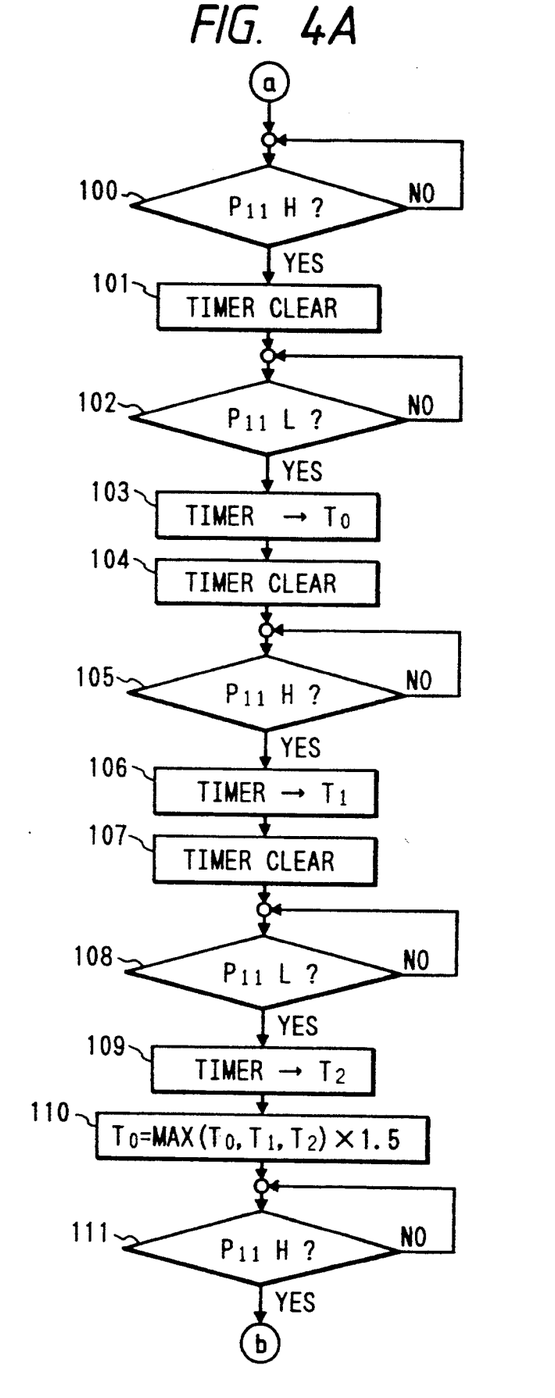
FIGS. 4A, 4B and 4C show a flow chart.
Figure 4B:
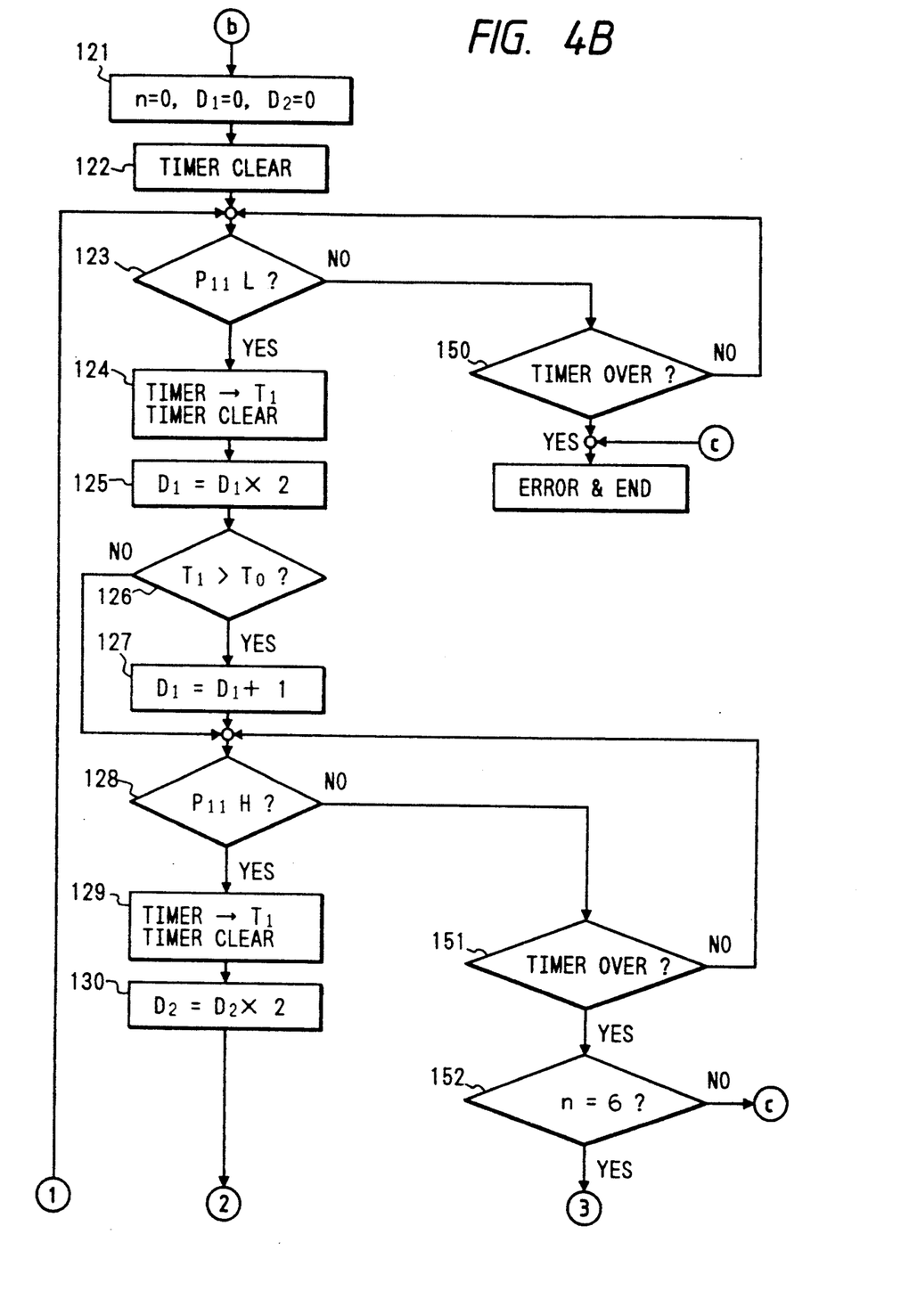
Figure 4C:
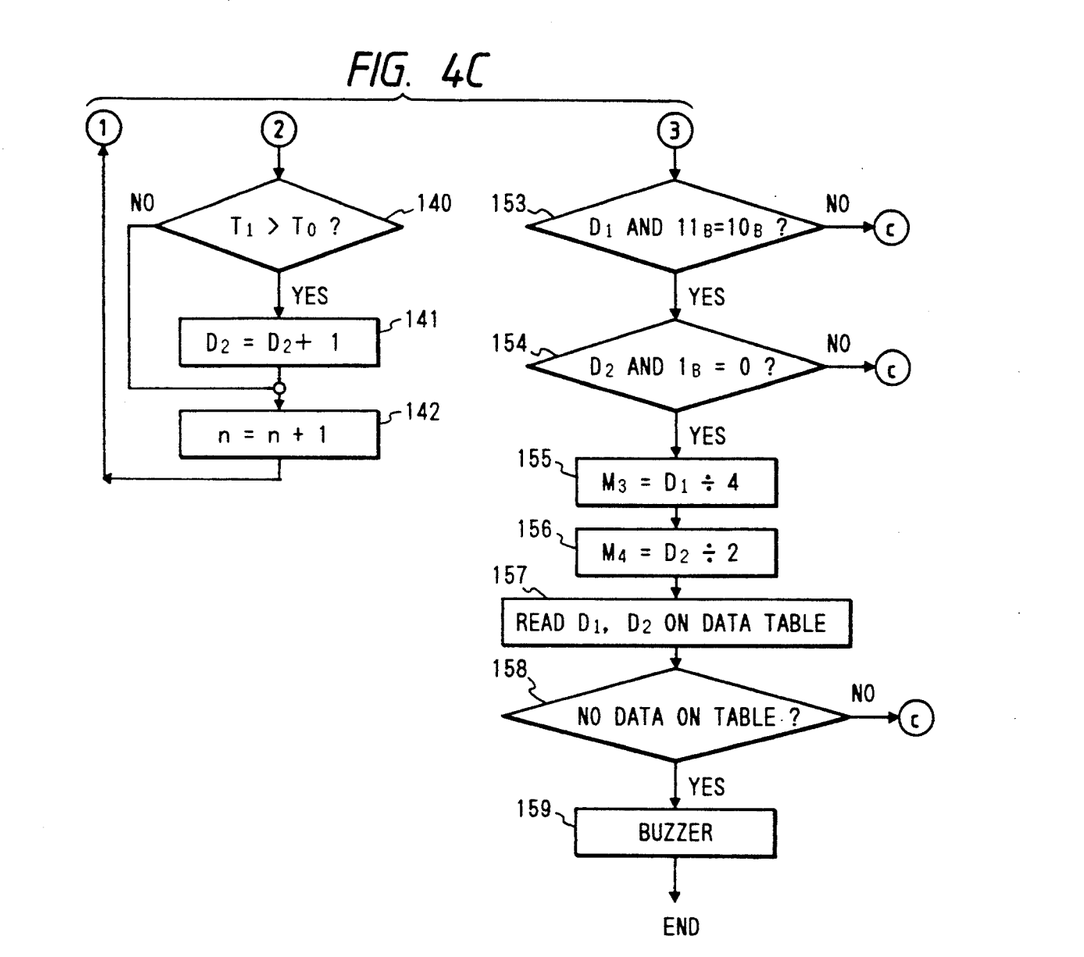

A bar code reading operation will be described below with reference to the flow chart shown in FIG. 4. As described in the arrangement of this embodiment, when the terminal P11 is at H level, a bar of the bar code is detected; when it is at L level, a space of the bar code is detected.

The control waits in step 100 until the first bar is detected. In steps 101 to 103, a time of the first narrow bar is measured. In steps 104 to 106, a time of a narrow space is measured, and in steps 107 to 109, a time of the next narrow bar is measured. A maximum value of these times is multiplied with 1.5, and the product is used as a time T0 used for narrow/wide judgment. Upon completion of measurement of the time T0 using the start bar, a data register is cleared in step 121 to read data. In steps 123 and 124, a time of a bar is read, and if the read time is longer than T0, "1" is determined, the read data is doubled, and 1 is added to the doubled data. In other cases, the read data is only doubled. In steps 128 and 129, a time of a space is read, and if the read time is longer than T0, "1" is determined, and the same operations are performed.

Every time a set of a bar and a space are read, n is incremented, and reading of the bar and space is repeated. It is detected in steps 150 and 151 whether or not a timer overflows. If it is determined that the timer overflows, it is determined that reading of a bar code is completed. If it is determined in step 150 that the timer overflows, an error is determined, and the processing is ended as an error. If it is determined in step 151 that the timer overflows, it is checked in step 152 based on the number of bars whether or not reading is normally ended. In steps 153 and 154, an end bar is checked, and if NG is determined, an error is determined and the processing is ended at (c).

If the above-mentioned checking operations are OK, a portion corresponding to data of the end bar is excluded in steps 155 and 156, thus obtaining a binary expression of data represented by the bar code. Thus, this binary data is converted according to Table 1 to obtain data of the bar code. At this time, if no corresponding data is found from the table, an error is determined, and the processing is ended.

Figures 5A, 5A:
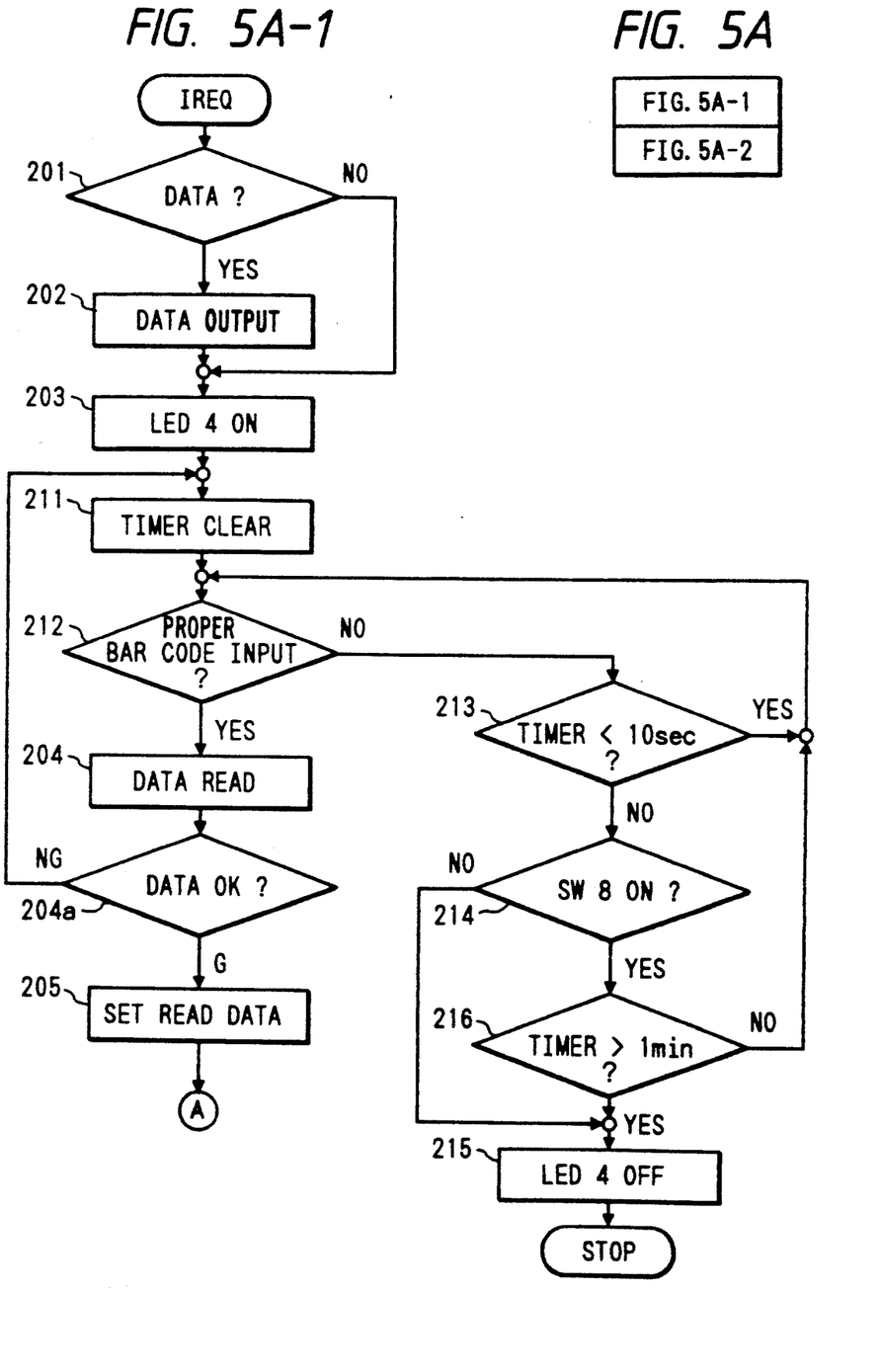
Figure 5A:
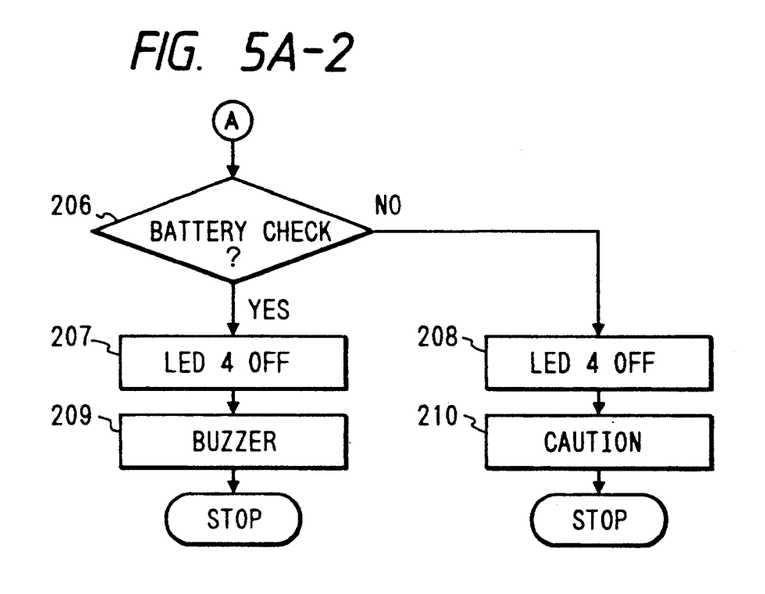
Figure 5B:
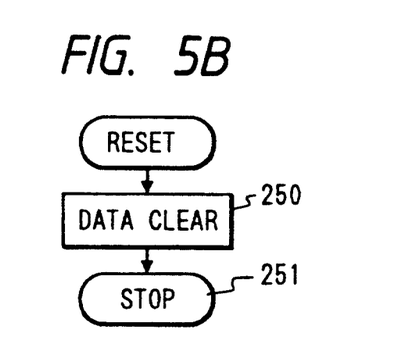

In the above arrangement, when the power supply of the bar code reading device is turned on, electric charges are accumulated in the capacitor 13 through the resistor 12. Therefore, the terminal RESET of the MCU 1 is set at L level for a predetermined period of time. At this time, the MCU 1 clears a transmission data area of the RAM (e.g., writes $FF_H$), as shown in step 250 in the flow chart of FIG. 5. Thereafter, the MCU 1 is set in the stop state in step 251.

When the switch 8 is turned on, an interrupt operation is started, and the flow chart shown in FIG. 5 is executed. When the switch 8 is depressed, it is checked if the transmission data area of RAM memorizes the "BAR CODE DATA" (step 201). In the normal state, operation proceeds to step 202 because the "BAR CODE DATA" has already been memorized in the transmission data area of RAM by a previous data reading operation. In step 202, the "BAR CODE DATA" is output by an optical signal. On the other hand, when the switch is newly depressed, the "BAR CODE DATA" has not yet been memorized in the data area of RAM for transmission. Accordingly, the operation jumps to step 203 and the data output operation of step 202 is skipped. LED 4 is turned on at step 203 and the reading operation of the "BAR CODE DATA" is executed. At step 211, the timer is cleared and started up.

Step 212 judges whether the "BAR CODE DATA" is input by the reading operation. If there is an input, the "BAR CODE DATA" is read at step 204 and the reliability of the data is checked at step 204a. If the "BAR CODE DATA" is not appropriate, operation returns to step 211 where the data reading is tried again. On the other hand, if the "BAR CODE DATA" read in step 204 is proper in step 204a, step 205 is performed. The read content (01 for the bar code 30) is written in the transmission data area of the RAM by a BCD code (step 205). Thereafter, it is checked if the input terminal P12 is at H level (step 206). If it is determined in step 206 that the terminal P12 is at H level, since the battery voltage is sufficient, the LED 4 is turned off (step 207), and a 4-kHz output is supplied to the output terminal P22 for a predetermined period of time (e.g., 50 msec) to drive the buzzer 11 (step 209). If it is determined that the input terminal P12 is at L level, the LED 4 is turned off (step 208), and after a 4-kHz output is supplied to the output terminal P22 for a predetermined period of time (e.g., 50 msec), the system halts for a while (e.g., 200 msec). Thereafter, a 4-kHz output is output again for a predetermined period of time (e.g., 50 msec) to caution a battery shortage (step 210).

When the switch is turned on again, since 01H is written in the transmission data area of the RAM, a transmission operation is performed. The transmission operation is performed in such a manner that this data is written in the SCI (serial communication interface) in the MCU 1 to cause it to perform the transmission operation. In response to the output from the SCI, the IRED 7 is turned on, and this optical output is detected by the SPD 23, thereby detecting the output from the SCI. With this signal, the data processing circuit 22 performs control according to the bar code 30.

If it is determined that no bar code input is detected while the LED is turned on (step 212), the number of seconds of the timer is checked (step 213). When the switch 8 is not depressed, if the timer has measured 10 seconds, the LED 4 is turned off to set a stop state (steps 214 and 215); when the switch 8 is depressed, the LED 4 is turned off after the timer has measured one minute or more (steps 214 and 216). During this period, however, if a bar code input is detected, a data read state is set (branching to step 204).

As described above, according to the data reading device of the first embodiment, every time the push switch is depressed once, the reading operation is started, and a first timer for ending the reading operation after the lapse of a predetermined period of time if the switch is not depressed, and a second timer for ending the reading operation after the lapse of a time longer than that of the first timer even if the switch is depressed are arranged, thus improving operability, and preventing wasteful consumption of a battery.

Figure 6:
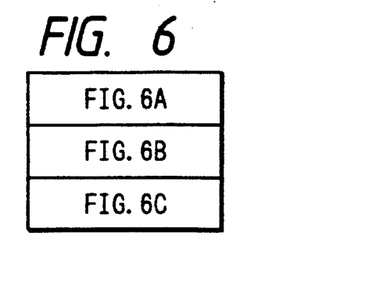
FIGS. 6, 6A, 6B and 6C comprise a flow chart showing a bar code reading operation according to the second embodiment of the present invention.
Figure 6A:
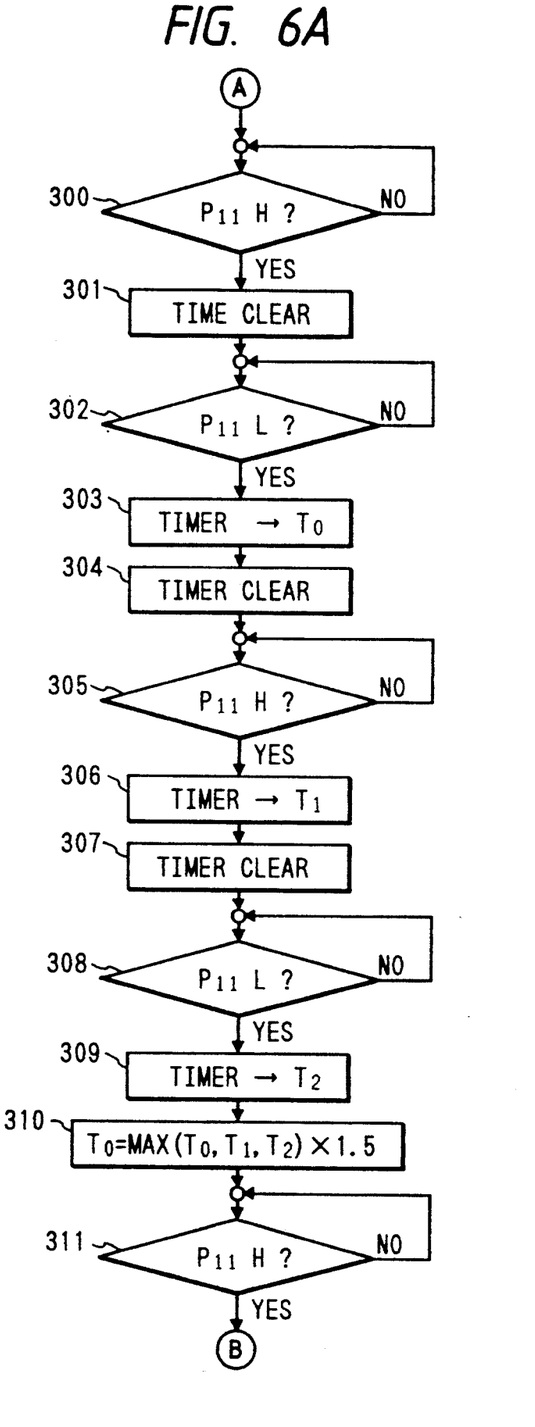
Figure 6B:
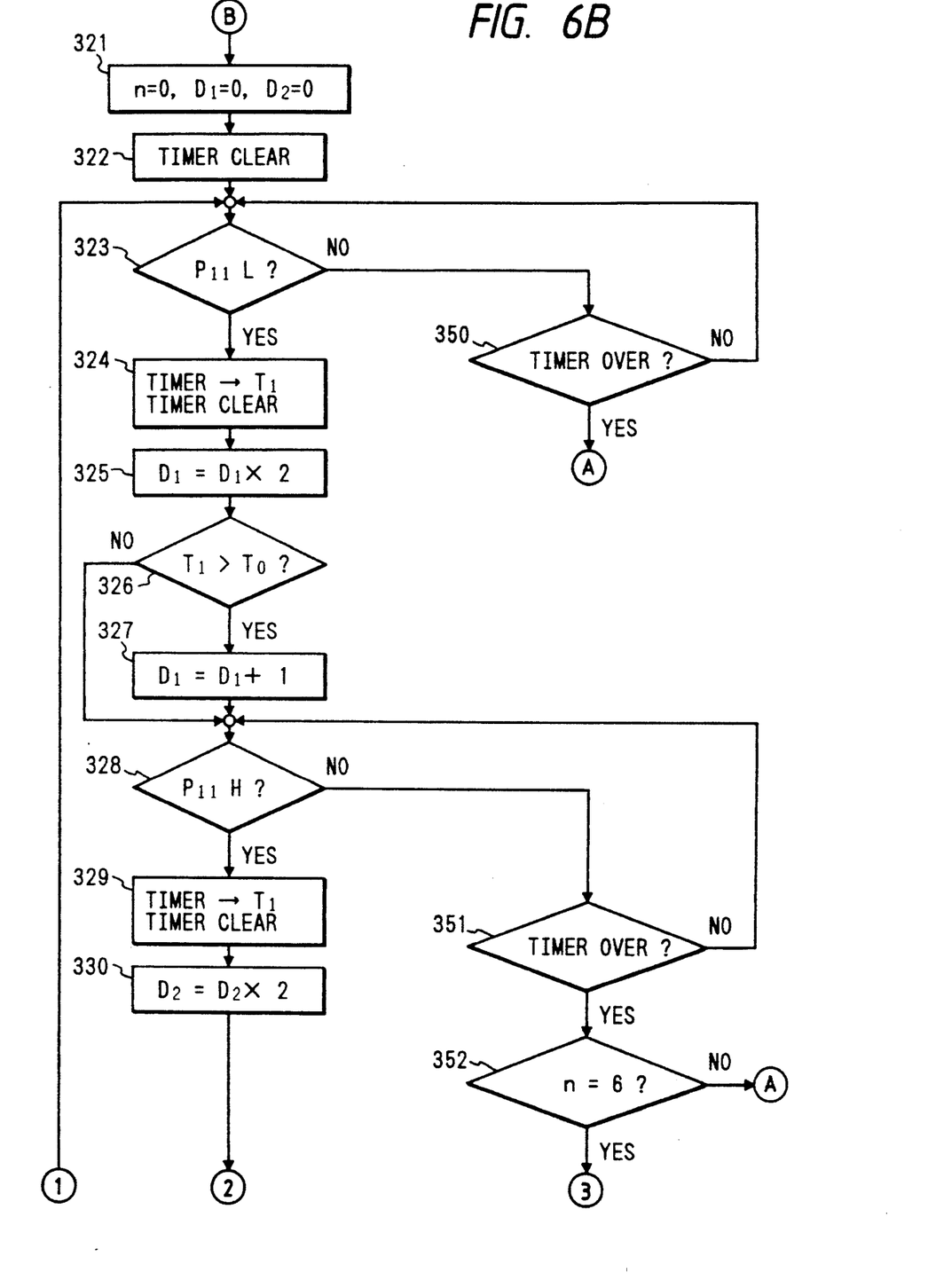
Figure 6C:
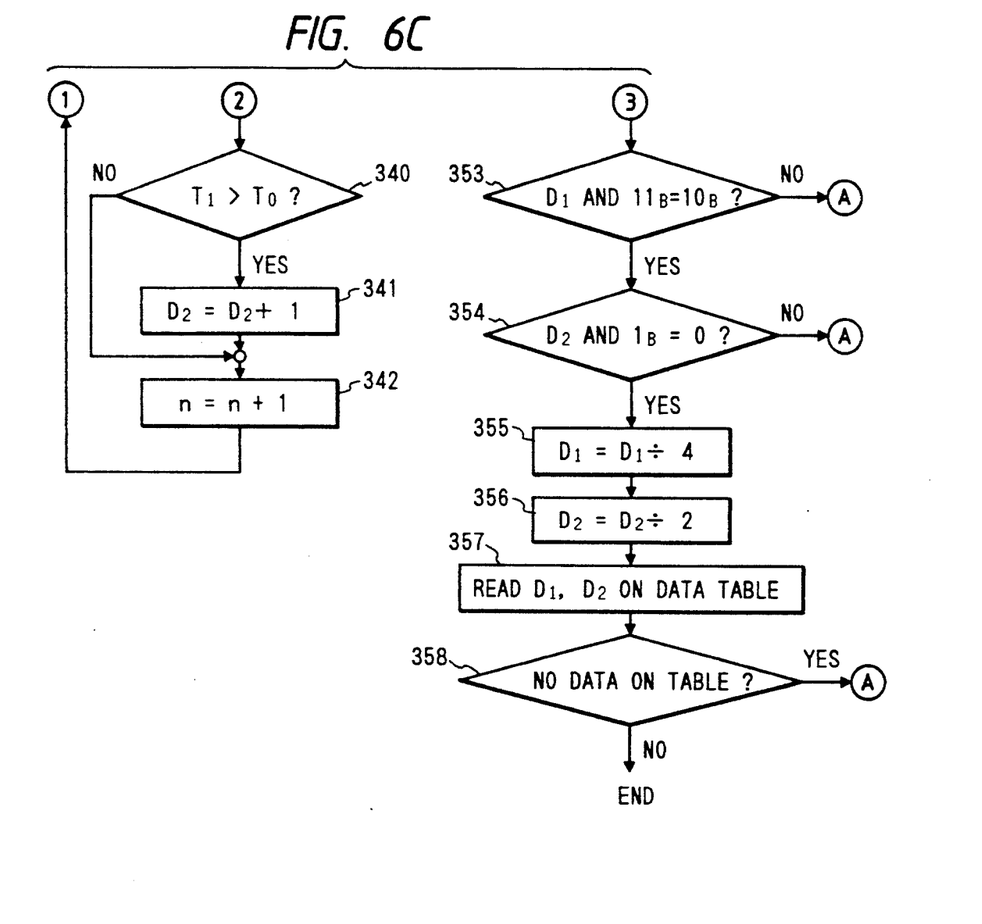

The second embodiment will be described below with reference to FIGS. 6 and 7.

A reading operation of the bar code 30 will be described below with reference to the flow chart shown in FIG. 6. Note that this operation is started in response to a first ON event of the switch 8, as will be described later.

As described above, if an output from the code detection circuit 2, i.e., an input to the input terminal P11 of the MCU 1 is at H level, a bar of the bar code 30 is detected; if it is at L level, a space of the bar code is detected.

Six registers T0, T1, T2, n, D1, and D2 are prepared in the RAM in the MCU 1.

The control waits in step 300 until the first bar is detected. In steps 301 to 303, a time of the first narrow bar is measured. In steps 304 to 306, a time of a narrow space is measured, and in steps 307 to 309, a time of the next narrow bar is measured. A maximum value of these times is multiplied with 1.5 (step 310), and the product is used as a time T0 used for narrow/wide judgment.

Upon completion of measurement of the time T0 using the start bar, a data register is cleared in step 321 to start data reading.

In steps 323 and 324, a time of a bar is read, and if the read time is longer than T0, "1" is determined, the read data is doubled, and 1 is added to the doubled data (step 327); otherwise, the read data is simply doubled (step 325). In steps 328 and 329, a time of a space is read, and if the read time is longer than T0, "1" is determined, and the same operations are performed.

Every time a set of a bar and a space are read, n is incremented, and reading of the bar and space is repeated.

It is detected in steps 350 and 351 whether or not a timer overflows. If it is determined that the timer overflows, it is determined that reading of a bar code is completed. If it is determined in step 350 that the timer overflows, an error is determined, and the processing is restarted from ⓐ, i.e., step 300. If it is determined in step 351 that the timer overflows, it is checked in step 352 based on the number of bars whether or not reading is normally ended. In steps 353 and 354, an end bar is checked, and if NG is determined (reading is not normally ended), an error is determined and the operation is restarted from ⓐ.

If the above-mentioned checking operations are OK, a portion corresponding to data of the end bar is excluded in steps 355 and 356, thus obtaining a binary expression of data represented by the bar code. Thus, this binary data is converted in step 357, thereby obtaining data of the bar code. At this time, if no corresponding data is found from a table, an error is determined (step 358), and the operation is restarted from ⓐ to perform reading again.

The operation of the system of the second embodiment will be described below with reference to the flow chart shown in FIGS. 7A and 7B.

In the above arrangement, when the power supply of the bar code reading device 19 is turned on, electric charges are accumulated in the capacitor 13 through the resistor 12. Therefore, the input terminal RESET of the MCU 1 is set at L level for a predetermined period of time. At this time, the MCU 1 clears a transmission data area of the RAM (e.g., writes FF$_H$), as shown in step 450 in the flow chart of FIG. 7A. Thereafter, the MCU 1 is set in the stop state in step 451.

Figures 7A, 7B:
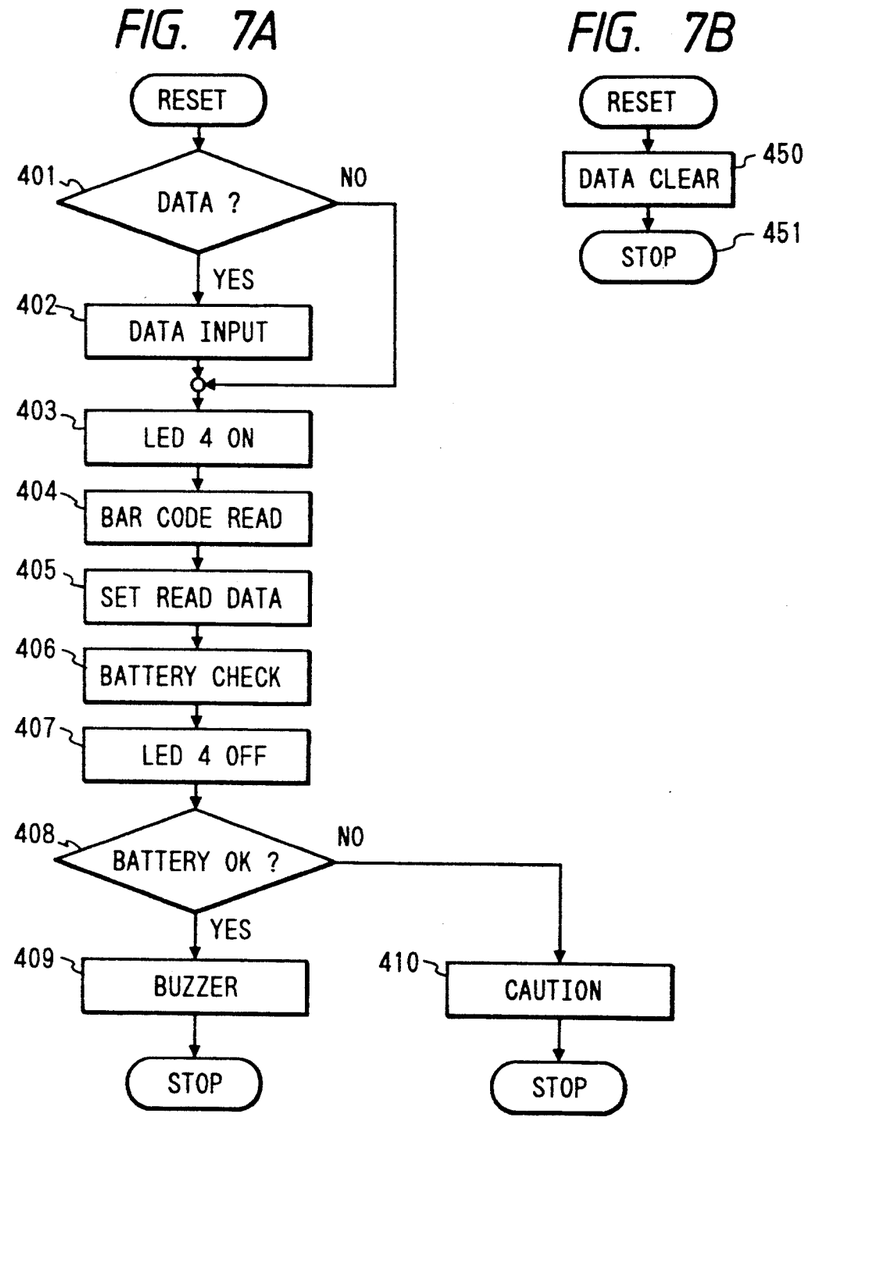
FIGS. 7A and 7B are flow charts showing an operation of the overall bar code data reading device.

When the switch 8 is depressed, an interrupt operation is started, and an operation is executed from step 401 in FIG. 7A.

When the switch 8 is turned on first, since there is no data, data transmission is not performed according to the judgment result in step 401, and the LED 4 is turned on in step 403 to perform a bar code reading operation described with reference to FIG. 6 (step 404). Upon completion of reading, the read content ("01" when the bar code 30 is read) is written in the transmission data area of the RAM by a BCD code (step 405). Thereafter, it is checked in step 406 if the input terminal P12 is at H level. If the terminal P12 is at H level, since the voltage of the battery 9 is sufficient, after the LED 4 is turned off, a 4-kHz output is supplied to the output terminal P22 for a predetermined period of time (e.g., 50 msec) to drive the piezoelectric buzzer 11. On the other hand, if the input terminal P12 is at L level, the LED 4 is turned off, and after a 4-kHz output is supplied to the output terminal P22 for 50 msec, the system halts for 200 msec. Thereafter, a 4-kHz output is output again for 50 msec to caution a battery shortage.

When the switch 8 is turned on again, since "01" (decimal notation) is written in the transmission area (SCI in the MCU 1) on the RAM in turn, the transmission operation is started in step 402.

In response to the output from the SCI, the IRED 7 is turned on, and this light signal is detected by the SPD 23, so that a signal having the same waveform as the output from the SCI is input to the data processing circuit 22 through the detection circuit 21. The circuit 22 performs control according to the content of the bar code 30 on the basis of this signal.

Figure 3:
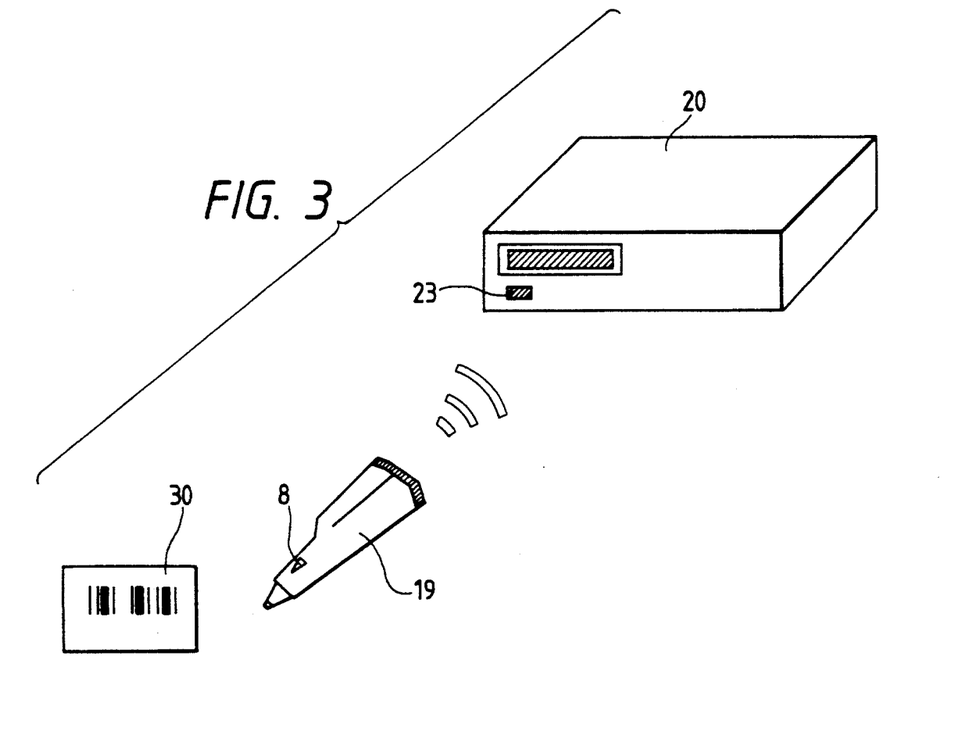
FIG. 3 is a perspective view of a data reading device and a data processing device of the first embodiment.

Upon completion of the transmission operation, operations in step 403 and subsequent steps are started. In this case, as shown in FIG. 3, since the device 19 is directed toward the data processing device 20 side, no bar code reading operation in step 404 is performed. When the bar code reading operation is performed again, the device 19 is directed toward the bar code 30 and the switch 8 is turned on, thus starting the reading operation in the above-mentioned sequence.

According to this embodiment, the transmission operation is performed first, and then, the reading operation is performed by one switch 8. Therefore, the device can be rendered compact. Since the switch 8 can be arranged at a position where the operability of the device is the best, the operability of the device can be improved, and cost can also be reduced.

Since time-serial control need only be performed according to a signal from one switch 8, a control flow chart can be simplified, and a program can be created to have a smaller number of steps than that when a plurality of input means are arranged.

Since a battery check operation is performed in a series of operations, neither a special indication for the battery check operation (since it also serves as a data transmission or reading end indication), nor an operation member are required. Therefore, the device can be rendered compact, and cost can be reduced.

Furthermore, since the LED 4 for reading a bar code is used as a real load, a precise battery check operation can be assured.

In the above embodiment, when a voltage of the battery 9 is insufficient, a caution tone is generated. Alternatively, an LED may be used, and may be turned on when the battery voltage is "sufficient" and may flash when it is "insufficient". Of course, any other indication means may be used. A battery check indication is made after the reading operation is completed, but may be performed when the transmission operation is started or ended.

The reading operation of the bar code 30 is performed by manually scanning the pen-like bar code data reading device 19, as shown in FIG. 3. As a matter of course, other reading methods by means of mechanical or optical scan may be employed.

Data transmission is attained by optical communications. However, a device which transmits data by electrically connecting terminals can perform a reading operation and a data transmission operation by one switch.

As described above, according to the second embodiment, one switch means, and a control means for causing a transfer means to perform a data transfer operation in response to an operation of the switch means, and then causing a reading means to perform a data reading operation are arranged. Thus, when the switch means, which is arranged at a position where it is easy to operate since only one switch means is arranged, is operated, a data transmission operation and a data reading operation are time-serially performed, so that a compact bar code reading device with good operability can be provided.

TABLE 1

| Character | Weight | | | | Parity |
|---|---|---|---|---|---|
| | 1 | 2 | 4 | 7 | P |
| 0 | 0 | 0 | 1 | 1 | 0 |
| 1 | 1 | 0 | 0 | 0 | 1 |
| 2 | 0 | 1 | 0 | 0 | 1 |
| 3 | 1 | 1 | 0 | 0 | 0 |
| 4 | 0 | 0 | 1 | 0 | 1 |
| 5 | 1 | 0 | 1 | 0 | 0 |
| 6 | 0 | 1 | 1 | 0 | 0 |
| 7 | 0 | 0 | 0 | 1 | 1 |
| 8 | 1 | 0 | 0 | 1 | 0 |
| 9 | 0 | 1 | 0 | 1 | 0 |

What is claimed is:

1. A data reading device comprising:
   (a) data reading means for reading data;
   (b) an operation switch;
   (c) control means for setting said data reading means in a data reading state upon operation of said operation switch;
   (d) a timer for measuring a first time period in which said data reading state is continued to read data even after said operation of said operation switch si canceled and for measuring a second time period in which no data is input to said data reading means although said operation switch is operated; and
   (e) said control means being operative to terminate said reading state of said data reading means on the basis of measurement information of said timer, said data reading state being maintained at least until said timer measures said first time period even after the operation of said operation switch is cancelled.

2. A device according to claim 1, wherein said operation of said operation switch is to depress a switch member, and to cancel said operation is to release the depression of said switch member.

3. A device according to claim 1, wherein said data is a bar code.

4. A device according to claim 1, wherein said data reading means projects light to said data, and reads a content of said data by light reflected from the data.

5. A device according to claim 4, wherein said data reading means continues projection of said light in said data reading state, and stops projection of said light to terminate said data reading state.

6. A device according to claim 1, wherein said data read by said data reading means is stored in a memory.

7. A device according to claim 1, wherein said control means keeps said data reading state while an actual data reading action is being performed even after said operation of said operation switch is canceled.

8. A device according to claim 7, wherein said control means judges completion of said data reading state in accordance with read data, and thereupon terminates said data reading state of said data reading means.

9. A device according to claim 1, wherein said control means terminates said data reading state of said data reading means in response to at least one of a count end signal of a first predetermined time and a count end signal of a second predetermined time of said timer.

10. A device according to claim 9, wherein said second predetermined time is set to be longer than said first predetermined time.

11. A device according to claim 9, wherein said operation of said operation switch is to depress a switch member, and to cancel said operation is to stop depression of said switch member.

12. A device according to claim 9, wherein said data is a bar code.

13. A device according to claim 9, wherein said data reading means projects light to said data, and reads a content of said data by light reflected from the data.

14. A device according to claim 13, wherein said data reading means continues projection of said light in said data reading state, and stops projection of said light to terminate said data reading state.

15. A device according to claim 9, wherein said control means keeps said data reading state while an actual data reading action is being performed even after said operation of said operation switch is canceled.

16. A device according to claim 15, wherein said control means judges completion of said data reading state in accordance with read data, and thereupon terminates said data reading operation of said data reading means.

17. A data reading device comprising:
   (a) data reading means for reading data;
   (b) an operation switch;
   (c) control means for setting said data reading means in a data reading state upon operation of said operation switch and for switching said data reading means from said data reading state to a non-reading state, said control means judging completion of said data reading operation according to read data, and thereupon switching to said non-reading state, and switching to said non-reading state after a predetermined time period in which no data is input to said data reading means although said operation switch is operated, and (d) wherein said control means keeps said data reading state while an actual data reading action is being performed even after said operation of said operation switch is cancelled.

18. A device according to claim 17, wherein said operation of said operation switch is to depress a switch member, and to cancel said operation is to release the depression of said switch member.

19. A device according to claim 17, wherein said data is a bar code.

20. A device according to claim 17, wherein said data reading means projects light to said data, and reads a content of said data from light reflected by the data.

21. A device according to claim 20, wherein said data reading means continues projection of said light in said data reading state, and stops projection of said light to terminate said data reading state.

22. A system having a data reading device and a data processing device, (A) said data reading device;
  (A-1) data reading means for reading data;
  (A-2) an operation switch;
  (A-3) control means for setting said data reading means in a data reading state upon operation of said operation switch;
  (A-4) a timer for measuring a first time period in which said data reading state is continued to read data even after said operation of said operation switch is canceled and for measuring a second time period in which no data is input to said data reading means although said operation switch is operated;
  (A-5) said control means being operative to terminate said reading state of said data reading means on the basis of measurement information of said timer, said data reading state being maintained at least until said timer measures said first time period even after the operation of said operation switch is cancelled; and
  (A-6) output means for outputting said data read by said data reading means to said data processing device, and (B) said data processing device comprising:
  (B-1) input means for inputting said data output from said output means for said data reading device; and
  (B-2) data processing means controlled on the basis of said data input at said input means.

23. A system according to claim 22, wherein said operation of said operation switch is to depress a switch member, and to cancel said operation is to release the depression of said switch member.

24. A system according to claim 22, wherein said data is a bar code.

25. A system according to claim 22, wherein said data reading means projects light to said data, and reads a content of said data by light reflected from the data.

26. A system according to claim 25, wherein said data reading means continues projection of said light in said data reading state, and stops projection of said light to terminate said reading operation state.

27. A system according to claim 22, wherein said data read by said data reading means is stored in a memory.

28. A system according to claim 27, wherein said data is stored in said memory by a BCD code.

29. A system according to claim 22, wherein said control means keeps said data reading state while an actual data reading action is being performed even after said operation of said operation switch is canceled.

30. A system according to claim 29, wherein said control means judges completion of said data reading state in accordance with said read data, and thereupon terminates said data reading state of said data reading means.

31. A system according to claim 22, wherein said control means stops said reading state of said data reading means in response to at least one of a count end signal of a first predetermined time and a count end signal of a second predetermined time of said timer.

32. A system according to claim 22, wherein said output means includes a light-emitting element, and outputs said data by light projected from said light-emitting element.

33. A system according to claim 32, wherein said input means includes a light-receiving element, sand receives the light projected by said light-emitting element by said light-receiving element to input said data.

* * * * *

UNITED STATES PATENT AND TRADEMARK OFFICE
CERTIFICATE OF CORRECTION

PATENT NO. : 5,321,245
DATED : June 14, 1994
INVENTOR(S) : JIRO KAZUMI

It is certified that error appears in the above-identified patent and that said Letters Patent is hereby corrected as shown below:

ON TITLE PAGE

In [56] References Cited, under U.S. PATENT DOCUMENTS:
"4,845,349  6/1989  Cherry" should read
--4,845,349  7/1989  Cherry--.

In [57] ABSTRACT:
Line 2, "a" should read --a data--.
Line 4, "a" (first occurrence) should read --a first-- and "first" should be deleted.
Line 6, "and" should read --and a second timer-- and "second time period" should read --time--.
Line 8, "canceled" should read --cancelled--.

COLUMN 3

Line 8, "wide" (second occurrence) should read --narrow--.
Line 62, "NG" should read --NO--.

COLUMN 4

Line 14, close up right margin.
Line 15, close up left margin.

COLUMN 7

Line 67, "si" should read --is--.
Line 68, "canceled" should read --cancelled--.

UNITED STATES PATENT AND TRADEMARK OFFICE
CERTIFICATE OF CORRECTION

PATENT NO. : 5,321,245
DATED : June 14, 1994
INVENTOR(S) : JIRO KAZUMI

It is certified that error appears in the above-identified patent and that said Letters Patent is hereby corrected as shown below:

COLUMN 8

Line 28, "canceled" should read --cancelled--.
Line 57, "canceled" should read --cancelled--.

COLUMN 10

Line 30, "canceled" should read --cancelled--.
Line 46, "sand" should read --and--.

Signed and Sealed this

Seventeenth Day of January, 1995

Attest:

BRUCE LEHMAN

Attesting Officer

Commissioner of Patents and Trademarks